US 9,508,080 B2

(12) United States Patent
Hoelz et al.

(10) Patent No.: US 9,508,080 B2
(45) Date of Patent: Nov. 29, 2016

(54) SYSTEM AND METHOD OF PRESENTING A COMMERCIAL PRODUCT BY INSERTING DIGITAL CONTENT INTO A VIDEO STREAM

(75) Inventors: Clifford Hoelz, Phoenix, AZ (US); Daniel D. Orlando, Tempe, AZ (US)

(73) Assignee: VIDCLX, LLC, Scottsdale, AZ (US)

( * ) Notice: Subject to any disclaimer, the term of this patent is extended or adjusted under 35 U.S.C. 154(b) by 1669 days.

(21) Appl. No.: 12/607,699

(22) Filed: Oct. 28, 2009

(65) Prior Publication Data
US 2011/0099069 A1 Apr. 28, 2011

(51) Int. Cl.
| | | |
|---|---|---|
| G06Q 30/00 | (2012.01) | |
| G06Q 30/02 | (2012.01) | |
| H04N 21/234 | (2011.01) | |
| H04N 21/478 | (2011.01) | |
| H04N 21/81 | (2011.01) | |
| H04N 21/858 | (2011.01) | |

(52) U.S. Cl.
CPC .......... *G06Q 30/02* (2013.01); *G06Q 30/0257* (2013.01); *G06Q 30/0267* (2013.01); *H04N 21/23424* (2013.01); *H04N 21/47815* (2013.01); *H04N 21/812* (2013.01); *H04N 21/8583* (2013.01)

(58) Field of Classification Search
CPC ............. G06Q 30/02; G06Q 30/0241; G06Q 30/0277
USPC .......................................................... 705/14
See application file for complete search history.

(56) References Cited

U.S. PATENT DOCUMENTS

| | | | |
|---|---|---|---|
| 2001/0052133 A1* | 12/2001 | Pack et al. ................... 725/109 |
| 2003/0028873 A1* | 2/2003 | Lemmons ........................ 725/36 |
| 2003/0079224 A1* | 4/2003 | Komar et al. ................... 725/32 |
| 2005/0137958 A1* | 6/2005 | Huber et al. .................... 705/37 |
| 2006/0271440 A1* | 11/2006 | Spinucci et al. ................. 705/14 |
| 2007/0118426 A1* | 5/2007 | Barnes, Jr. ....................... 705/14 |
| 2008/0033804 A1* | 2/2008 | McKenna ............. G06Q 30/02 705/14.4 |
| 2008/0059288 A1 | 3/2008 | Kokernak |
| 2008/0103875 A1 | 5/2008 | Kokernak et al. |
| 2008/0140523 A1* | 6/2008 | Mahoney et al. ............. 705/14 |
| 2008/0167992 A1 | 7/2008 | Kokernak et al. |
| 2009/0019487 A1* | 1/2009 | Kulas .............................. 725/41 |
| 2009/0158316 A1 | 6/2009 | Kokernak et al. |

* cited by examiner

*Primary Examiner* — Vincent Cao
(74) *Attorney, Agent, or Firm* — Robert D. Atkins; Atkins and Associates, P.C.

(57) ABSTRACT

In a commerce system, a commercial product is presented by transmitting a video stream through a communication link to present as an image on a video display. The image including a representation of the commercial product. An interactive device is used by a consumer to select a portion of the image on the video display representing the commercial product. The information related to the commercial product, such as product description, price, and ordering, is retrieved from a database or electronic search based on the selected portion of the image on the video display. Digital content containing the information related to the commercial product is generated by an adverting agent, manufacturer, or retailer. The digital content is inserted into the video stream to form composite video. The composite video is displayed on the video display to assist the consumer in completing a transaction to acquire the commercial product.

31 Claims, 10 Drawing Sheets

SYSTEM AND METHOD OF PRESENTING A COMMERCIAL PRODUCT BY INSERTING DIGITAL CONTENT INTO A VIDEO STREAM

FIELD OF THE INVENTION

The present invention relates in general to video processing and, more particularly, to a system and method for presenting a commercial product by inserting digital content into a video stream.

BACKGROUND OF THE INVENTION

People are exposed to video data in many situations and aspects of everyday life. Video data can be seen on televisions, digital video disc (DVD) players, computer monitors displaying an Internet webpage, and video screens found in public places, just to name a few. Most video feeds are prepackaged and delivered to a display monitor. For example, a primetime or syndicated television show or broadcast of a sporting event is packaged by a network producer and routed through the video service provider, e.g., cable or satellite provider, to the display monitor for viewing by the audience. The packaged digital content is not edited or altered once published by the video producer. In other words, the video service provider does not add digital content to the prepackaged program.

The video service provider may interleave commercial announcements between segments of the video stream. The video producer or video service provider can also overlay information over a predetermined, fixed portion of the display monitor, typically the bottom of the screen. For example, a public service notice or breaking news can be displayed as a runner across the bottom of the display monitor. In other cases, the video producer or video service provider may overlay scores of sporting events, upcoming programming, or commercial advertisements over the bottom portion of the screen during the airing of the packaged program. However, the additional video overlays a predetermined, fixed portion of the display monitor, but is not embedded with the content of the published video stream itself. The video overlay is allocated to the predetermined, fixed portion of the display monitor and has no dependence or relation to the content of the video stream. Changing the content of the packaged program would require republication of the video stream, which can only be done by the producer.

SUMMARY OF THE INVENTION

A need exists to insert digital content into a video stream after publication. Accordingly, in one embodiment, the present invention is a method of presenting a commercial product in a commerce system comprising the steps of providing a commercial product in a commerce system, and transmitting a video stream through a communication link to present as an image on a video display device. The image includes a representation of the commercial product. The method further includes the steps of providing an interactive device for a consumer to select a portion of the image on the video display device representing the commercial product, retrieving information related to the commercial product based on the selected portion of the image on the video display device, generating digital content containing the information related to the commercial product, inserting the digital content into the video stream to form composite video, and displaying the composite video including the digital content on the video display device to assist the consumer in completing a transaction to acquire the commercial product.

In another embodiment, the present invention is a method of presenting a commercial product in a commerce system comprising the steps of providing commercial products in a commerce system, transmitting a video stream through a communication link to present as an image on a video display device, generating first digital content containing the information related to a first commercial product, inserting the first digital content into the image of the video stream to form a first composite video, and displaying the first composite video on the video display device during a first time period.

In another embodiment, the present invention is a computer program product comprising computer readable program code embodied in a computer usable medium. The computer readable program code is adapted to implement a method of presenting a commercial product in a commerce system comprising the steps of providing a commercial product in a commerce system, and transmitting a video stream through a communication link to present as an image on a video display device. The image includes a representation of the commercial product. The method further includes the steps of providing an interactive device for a consumer to select a portion of the image on the video display device representing the commercial product, retrieving information related to the commercial product based on the selected portion of the image on the video display device, generating digital content containing the information related to the commercial product, inserting the digital content into the video stream to form composite video, and displaying the composite video including the digital content on the video display device to assist the consumer in completing a transaction to acquire the commercial product.

In another embodiment, the present invention is a system for presenting a commercial product in a commerce system comprising a commerce system having a plurality of communication links for transmitting a video stream to present as an image on a video display device. The image includes a representation of a commercial product. An interactive device is used by a consumer to select a portion of the image on the video display device representing the commercial product. The system further includes means for retrieving information related to the commercial product based on the selected portion of the image on the video display device, means for generating digital content containing the information related to the commercial product, means for inserting the digital content into the video stream to form composite video, and means for displaying the composite video including the digital content on the video display device to assist the consumer in completing a transaction to acquire the commercial product.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
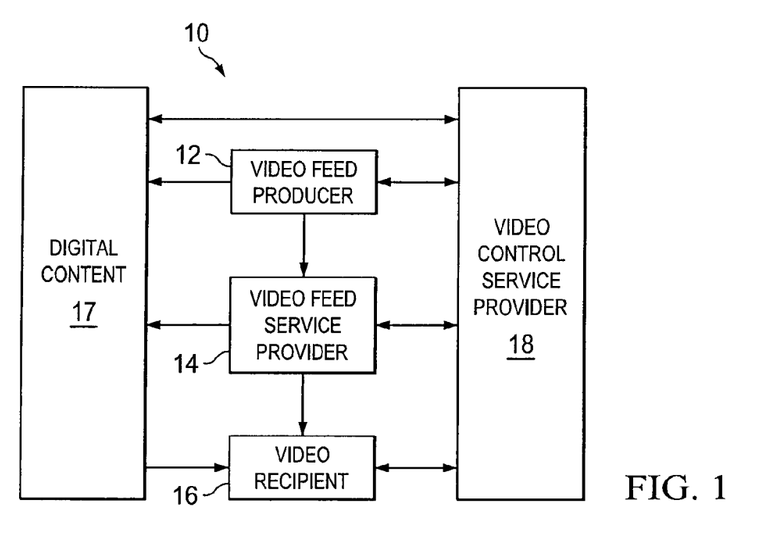
FIG. 1 is a block diagram of a system for producing, transmitting, and viewing digital content inserted into a video stream.

Video data is commonly transmitted across telecommunication systems. FIG. 1 shows a simplified telecommunication system 10 with video feed producer 12 creating a video stream. For example, video feed producer 12 could be a television network, cable network, studio film producer, DVD producer, or independent video producer creating feature films, primetime or syndicated entertainment programming, video clips, or other video data. The film, entertainment programming, or video stream can be comedy, drama, action, educational, documentary, sporting event, newscast, public service, or commentary, just to name a few. The video stream includes images with the actors, participants, surroundings, subject matter, and storyline associated with the programming. In a sporting event scene, the video stream may show a baseball batter at home plate preparing to receive a pitch. In an action scene, the good guy is in conflict with the bad guy. In an animated comedy scene, one character is engaged in a humorous setting with another character. In each case, the video stream is created, edited, and published by video feed producer 12 and then distributed as a published video to video feed service provider 14.

The video feed service provider 14 can be cable service providers, satellite service providers, mobile phone service providers, movie theatre, DVD player manufacturer, and Internet video player providers. The video feed service provider 14 routes the published video stream over established telecommunication medium to video recipient 16. The telecommunication medium can be cable lines, satellite, DVDs, wireless transmitter towers, Internet network, and the like. The video recipient 16 is typically the end viewer watching the film, entertainment programming, video clips, or other digital content on a video display device. For example, the consumer can watch the published video stream from home, private setting, or public place on a television, cellular phone, or computer display monitor.

Video control service provider 18 operates with video feed producer 12, video feed service provider 14, and video recipient 16 to enable dynamic insertion or other modification of targeted, contextual digital content 17 into a published video stream in real-time, independent of the operating mode or environment of video recipient 16. Video control service provider 18 enables digital content 17 from commercial sources to be selectively generated and inserted in a published video stream to modify the final image in the composite video (digital content inserted into the video stream) as viewed by video recipient 16 and, in some cases, elicit interaction with the video recipient. Digital content 17 is typically associated with a commercial product or service. The terms product and service are understood to be interchangeable. The commercial source can be a retailer, advertising agency, marketing firm, or manufacturer. The interaction with video recipient 16 may be simply noticing the inserted digital content. In other cases, the interaction may involve a response or query from video recipient 16 prompted by the composite video back to video feed producer 12 or video feed service provider 14. Based on the response or query from video recipient 16, video feed producer 12 or video feed service provider 14 generates and inserts specific or additional digital content 17 into the video stream in order to address the query from video recipient 16.

Figure 2:
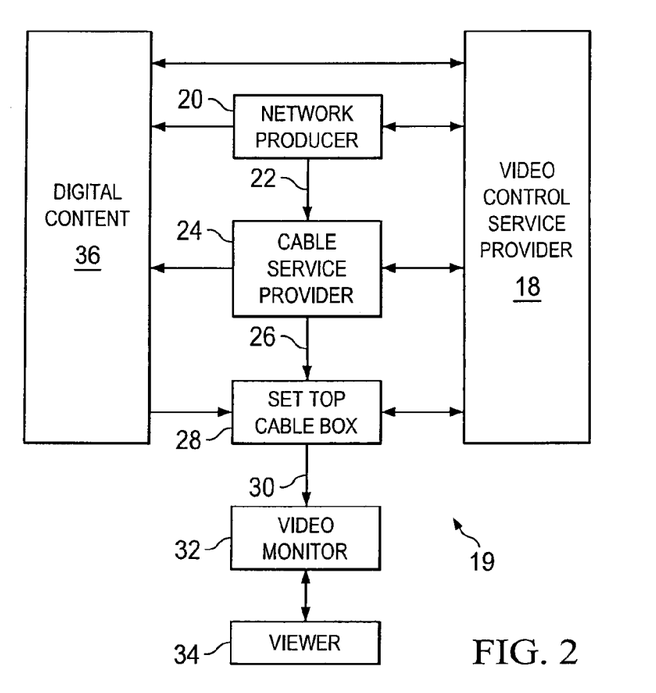
FIG. 2 is a block diagram of a cable television system for producing, transmitting, and viewing digital content inserted into the video stream.

FIGS. 2-11 describe specific examples of the telecommunication system 10 introduced in FIG. 1. FIG. 2 is a cable television system 19 including network producer 20 which creates a published video stream. In the present example, the published video stream is a primetime reality show for entertainment purposes. The published video stream is originally fixed in its content as created and edited by network producer 20. The published video stream is routed through communication channel 22 to cable service provider 24. Cable service provider 24 transmits the published video stream over communication channel 26 to set top cable box 28 located in the viewer's home or other private setting or public place. Communication channels 22 and 26 can be cable lines, satellite, wireless broadcast, or other electronic communication medium. Set top cable box 28 is connected through cable 30 to video display monitor 32, e.g., a television. Set top cable box 28 decodes the published video stream from cable service provider 24 for viewing on video display monitor 32. Viewer 34 (person) is able to watch the reality show on video display monitor 32.

Video control service provider 18 operates with network producer 20, cable service provider 24, and manufacturer of set top cable box 28 to enable dynamic insertion or other modification of targeted, contextual digital content 36 into the published video stream in real-time, independent of the operating mode or environment of video display monitor 32 and viewer 34. More specifically, video control service provider 18 generates software, firmware, or other computer readable code which is integrated into the electronic communication systems or channels used by network producer 20, cable service provider 24, and set top cable box 28. The software or firmware is installed in set top cable box 28 and electronic transmission equipment used by network producer 20 and cable service provider 24. The software allows additional digital content 36, not part of the original published video stream, to be selectively inserted into specific portions of the published video stream. The composite video, as seen by viewer 34, is a combination of the original published video stream and the inserted digital content 36.

Figure 3A:
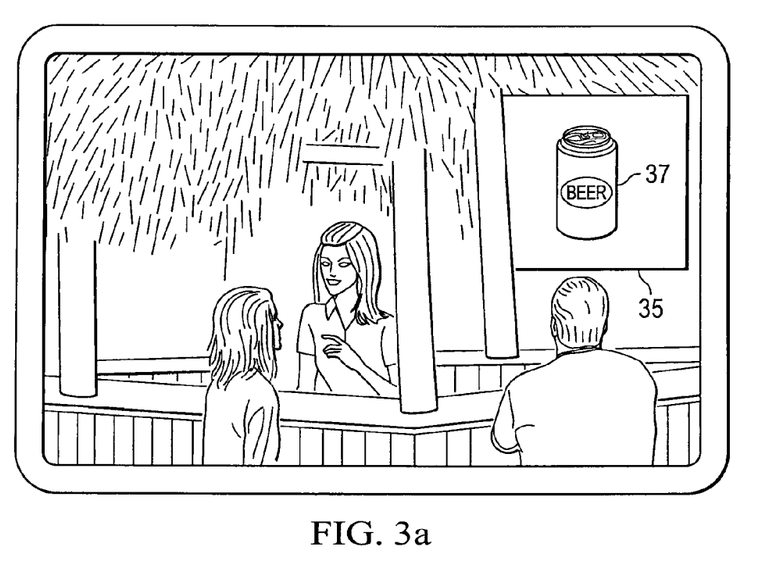
FIGS. 3a-3c illustrate the cable television displaying digital content inserted into a video stream.
Figure 3B:
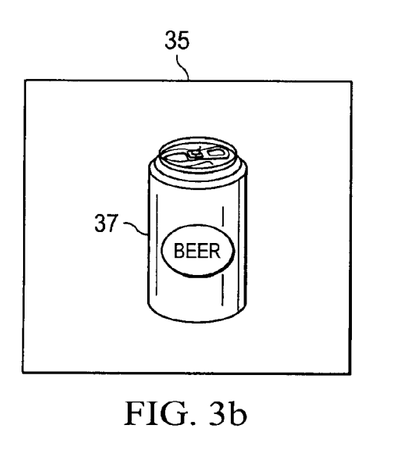
Figure 3C:
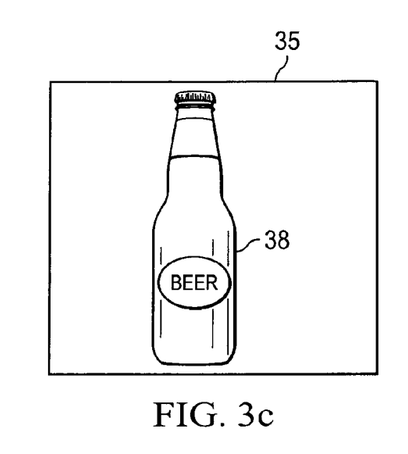

In the example of the reality show, FIG. 3*a* shows a scene with backdrop or poster 35. Network producer 20 may shoot the scene with a blue screen for poster area 35. The video stream has a fingerprint or video signature that identifies the spatial and temporal location in the video stream where each image is located on a pixel by pixel basis for each frame. The spatial locations, sometimes called "hot spots", and time frame is known for the blue screen. The blue screen can be overlaid by network producer 20 at publication with product 37 of any commercial sponsor, e.g., a popular beer. The image can be modified at any time by network producer 20 or cable service provider 24 generating different digital content 36 and inserting the digital content into the published video stream to show a different commercial product from the commercial sponsor, or a product from a different commercial sponsor. The first time the reality show is televised commercial product 37 is shown in poster area 35. FIG. 3*b* shows further detail of poster 35 displaying commercial product 37. The next time the reality show is aired, a different commercial product 38 can be displayed in poster area 35. FIG. 3*c* shows further detail of poster 35 displaying commercial product 38. Alternatively, when the show is televised, poster area 35 can display commercial product 37 in one city or geographic market, and commercial product 38 in a different city or geographic market, during the same time.

The scene need not be originally shot with poster 35 in blue screen. If the actor is consuming a container of a given commercial product clearly identified by its label at publication, the product or label can be changed by generating digital content 36 and inserting the digital content for a container of a different commercial product or different label over the original container. Thus, viewer 34 may see the actor consuming one commercial product at one time or in one geographic market, and consuming a different commercial product another time or in a different geographic market. Advertising space, i.e., poster area 35, can be sold on a frame by frame basis of the composite video. Any portion of the published video stream can be modified at any time by generating the desired digital content 36 and inserting the digital content at the desired location and time into the video stream prior to viewing on video display monitor 32.

Figure 4:
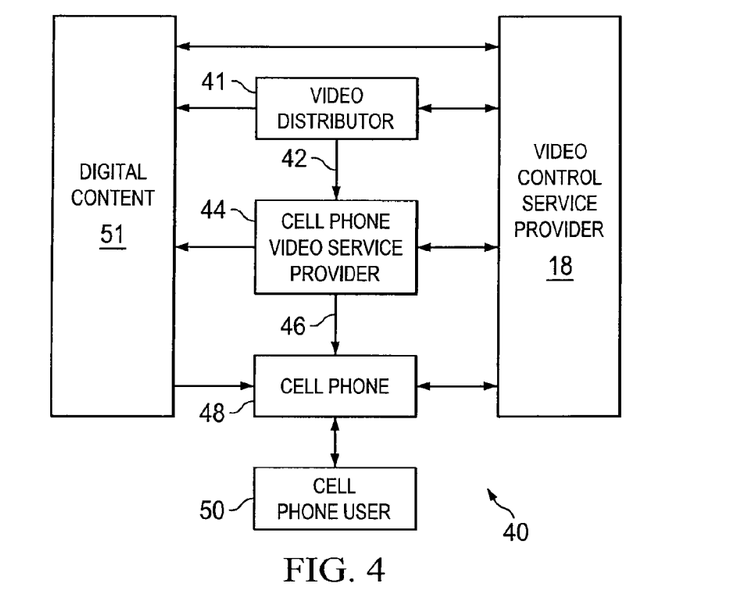
FIG. 4 is a block diagram of a cellular phone system for producing, transmitting, and viewing digital content inserted into the video stream.

In another example of telecommunication system 10, a cellular phone system 40 has video distributor 41 which makes published video streams available to cellular phone users, as shown in FIG. 4. The published video stream is routed through communication channel 42 to cellular phone video service provider 44. Cellular phone video service provider 44 transmits the published video stream over communication channel 46 to cellular phone 48. Communication channels 42 and 46 can be cable lines, satellite, wireless towers, or other electronic communication medium. Cellular phone user 50 (person) is able to watch the published video stream on cellular phone 48. In the case of cellular phone system 40, cellular phone user 50 makes a request for a specific published video stream using cellular phone 48 through cellular phone video service provider 44 to video distributor 41. Assume the requested published video is a broadcast sporting event. Video distributor 41 transmits the requested published sporting event through cellular phone video service provider 44 to cellular phone 48. Cellular phone user 50 views the requested video on cellular phone 48.

Video control service provider 18 operates with video distributor 41, cellular phone video service provider 44, and manufacturer of cellular phone 48 to enable dynamic insertion or other modification of targeted, contextual digital content 51 into the published video stream in real-time, independent of the operating mode or environment of cellular phone 48 and cellular phone user 50. More specifically, video control service provider 18 generates software, firmware, or other computer readable code which is integrated into the electronic communication systems or channels used by video distributor 41, cellular phone video service provider 44, and cellular phone 48. The software or firmware is installed in cellular phone 48 and electronic transmission equipment used by video distributor 41 and cellular phone video service provider 44. The software allows additional digital content 51, not part of the original published video stream, to be selectively inserted into specific portions of the published video stream. The composite video, as seen by cellular phone user 50, is a combination of the original published video stream and the inserted digital content 51.

Figure 5A:
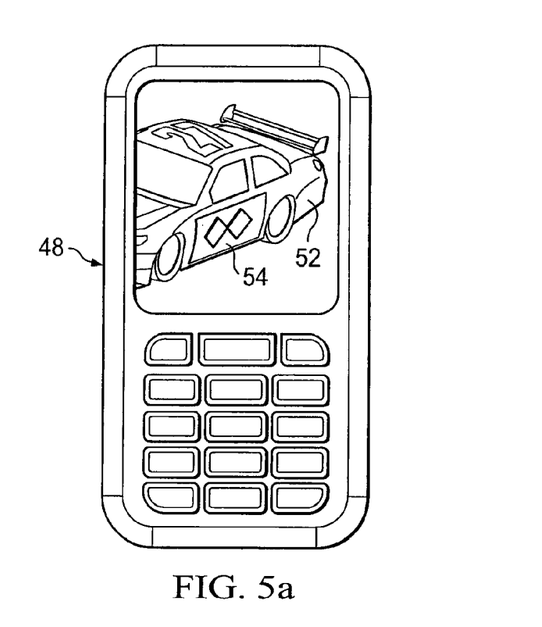
FIGS. 5*a*-5*b* illustrate the cellular phone displaying digital content inserted into a video stream.
Figure 5B:
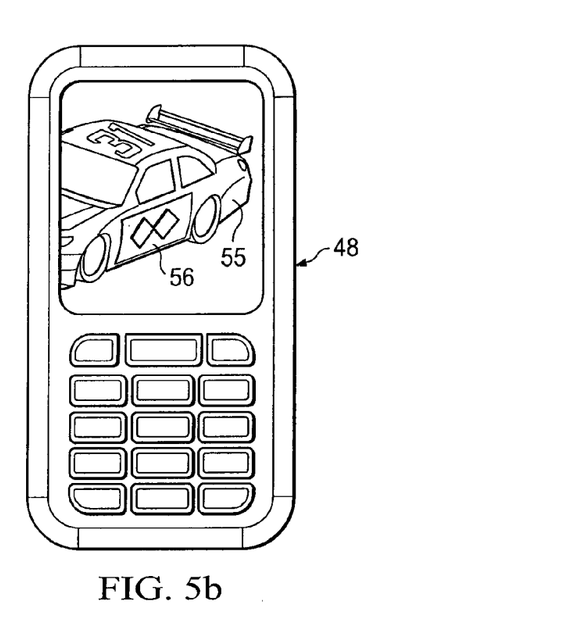

In the example of the broadcast sporting event, FIG. 5*a* shows cellular phone 48 displaying a NASCAR racing event. The lead car 52 has advertising space 54 for displaying a sponsor's logo or image on the hood, side, or back of the car. The advertising space 54 on lead car 52 is desirable to advertisers because the current lead car typically receives the most air time during the race. Again, the video stream has a fingerprint or video signature that identifies the spatial and temporal location in the video stream where the sponsorship display space 54 is located on a pixel by pixel basis for each frame. The image can be modified at any time by video distributor 41 or cellular phone video service provider 44 generating digital content 51 and inserting the digital content into the published video stream to show a different logo or image from the commercial sponsor, or a logo or image from a different sponsor. As the lead car changes, the display space on the new lead car can be changed with digital content 51. FIG. 5*b* shows cellular phone 48 with different lead car 55 displaying the same sponsor's logo in advertising space 56. A sponsor can have its logo on the current lead car at any given time during the race. Another sponsor can have its logo on the current lead car at another time during the race. A sponsor can have its logo on the second place car during the race. Although less desirable to advertisers than the current lead car, the second place car still receives significant air time, particularly when the second place car is challenging the lead car. By changing digital content 51, any sponsor can have its logo on any car during any time of the race. Advertising space 54 and 56 can be sold on a frame by frame basis of the composite video. Any portion of the published video stream can be modified at any time by generating and inserting digital content 51 at the desired location and time into the video stream prior to viewing on cellular phone 48.

The operations and structure described in FIGS. 2-5 represent activity within a commerce system, including a retailer, consumer, network producer, video distributor, intermediate communication service provider, advertising agency, and video control service provider. In particular, FIGS. 2-5 demonstrate a process of presenting a commercial product in a commerce system by transmitting a video stream through a communication link, such as elements 20-34 or 41-50, and inserting digital content associated with the commercial product into a portion of the image within the video stream (commercial logo on the side of a moving race car of FIGS. 5*a*-5*b*). The video stream with inserted digital content is presented on a video display monitor 32 or 48. The ability to insert the digital content as a representation of the commercial product into any portion of the video stream, provides many opportunities to present the commercial product.

Figure 6:
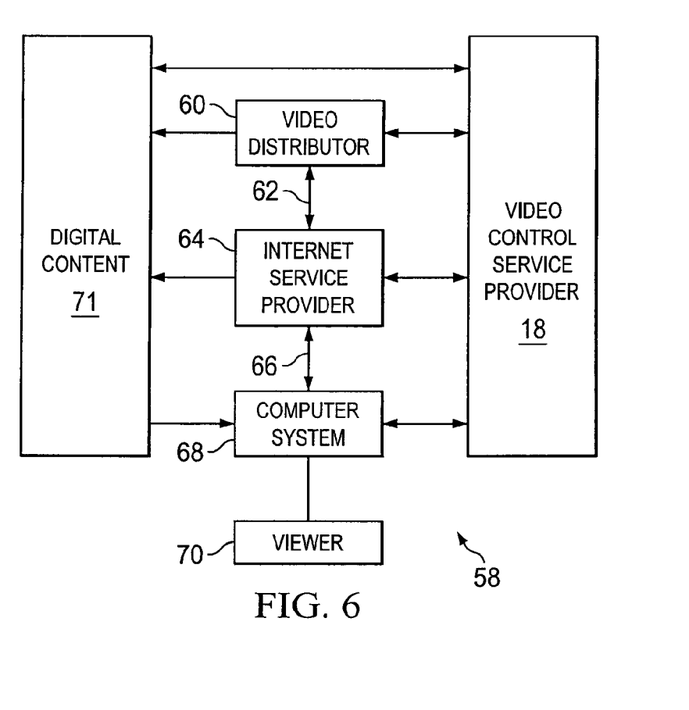
FIG. 6 is a block diagram of an Internet-based computer system for producing, transmitting, and viewing digital content inserted into the video stream.

Another example of telecommunication system 10 is shown in FIG. 6, as Internet system 58 including video distributor 60 which makes published video streams available to Internet users. The published video stream is routed through communication channel 62 to Internet service provider 64. Internet service provider 64 transmits the published video stream over communication channel 66 to computer system 68. Communication channels 62 and 66 can be cable lines, satellite, wireless channels, or other electronic communication medium. Viewer 70 (person) is able to watch the published video stream on computer system 68.

Figure 7:
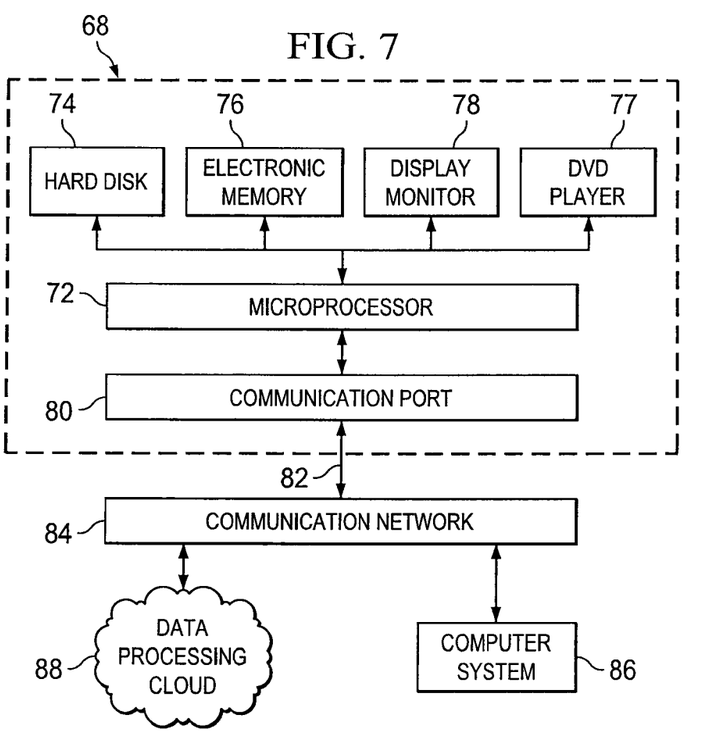
FIG. 7 illustrates further detail of the Internet-based computer system for viewing digital content inserted into the video stream.

Further detail of computer 68 is shown in FIG. 7. Computer system 68 includes central processing unit or microprocessor 72, mass storage device or hard disk 74, electronic memory 76, DVD player 77, display monitor 78, and communication port 80. Communication port 80 represents a modem, high-speed Ethernet link, wireless, or other electronic connection to transmit and receive input/output (I/O) data over communication link 82 to electronic communication network 84. Computer system 86 can be configured as shown for computer system 68. Computer system 86 transmits and receives information and data over communication network 84. Data processing cloud 88 provides distributed data processing capability for video control service provider 18.

Figure 8:
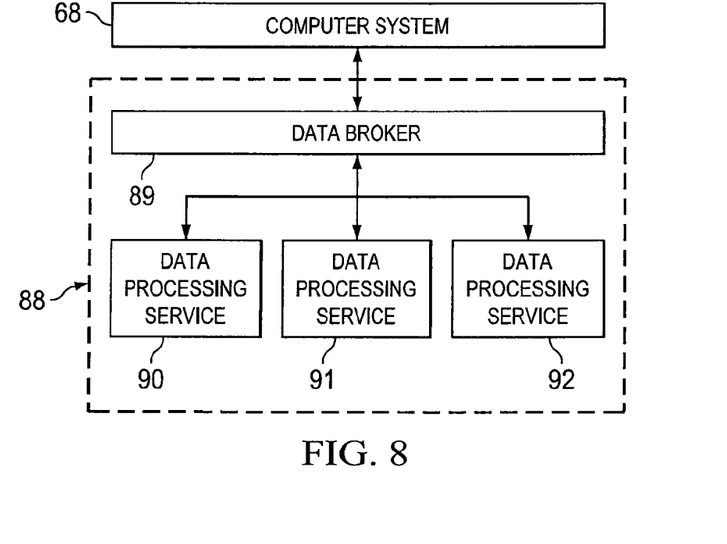
FIG. 8 is a distributed computer system for processing video related data.

FIG. 8 shows further detail of data processing cloud 88. Data processing cloud 88 is a distributed computing system including data broker 89 communicating with data processing service 90, data processing service 91, and data processing service 92. Cloud computing, also known as infrastructure as a service (IAAS), involves dynamically changing computer resources that can be delivered as a service in an environment that includes a network of shared resources. Large tracts of unused computing power and capacity carry costs associated with the large amount of space consumed by the hardware in large, expensive data centers. Any of the resources that reside in the cloud can be accessed at any time and from any place across the Internet. The cloud is responsible for providing a high level of availability and responsiveness when compared to legacy infrastructures. Data broker 89 is a processing job router which manages requests for processing service. Each data processing service 90-92 is a remote computer system, similar to computer system 68 in FIG. 7, used to perform video related data processing functions associated with video control service provider 18. Data processing cloud 88 lowers data infrastructure requirements and cost, increases reliability through efficient routing and built in redundancy, and allows video control service provider 18 to have scalability independent of data center and bandwidth acquisition and provides the flexibility for private network designs and integrations.

Computer 68 runs application software for executing computer readable instructions to display video images on display monitor 78. The application software can be one of many video multi-media players for computer systems, e.g., Quicktime, Windows Media Player, WinDVD, and Realplayer, just to name a few. The software is originally provided on computer readable media, such as compact disks (CDs), DVDs, external drive, or other mass storage medium. Alternatively, the software is downloaded from electronic links, such as the host or vendor website. The software is installed onto the computer system hard drive 74 and/or electronic memory 76, and is accessed and controlled by the computer's operating system. Software updates are also electronically available on mass storage medium or downloadable from the host or vendor website. The software, as provided on the computer readable media or downloaded from electronic links, represents a computer program product containing computer readable program code embodied in a computer program medium.

In the case of Internet system 58, viewer 70 makes a request for a specific published video stream using computer system 68 connected through Internet service provider 64 to video distributor 60 operating on computer system 86. Assume the requested published video is a full-length feature film or movie. Video distributor 76 transmits (downloads) the requested published video via Internet service provider 64 to computer system 68. The multi-media player on computer system 68 processes the downloaded video stream to show on display monitor 78 for viewer 70. The video stream can also originate from a video disc player or digital video recorder, such as DVD player 77.

Video control service provider 18 operates with video distributor 60, Internet service provider 64, and developer of the media player on computer system 68 to enable dynamic insertion or other modification of targeted, contextual digital content 71 into the published video stream in real-time, independent of the operating mode or environment of computer system 68. More specifically, video control service provider 18 generates software, firmware, or other computer readable code which is integrated into the electronic communication systems or channels used by video distributor 60, Internet service provider 64, and the developer of the multi-media player on computer system 68. The software or firmware is installed in computer system 68 and electronic transmission equipment used by video distributor 60 and Internet service provider 64. The software allows additional digital content 71, not part of the original published video stream, to be selectively inserted into specific portions of the published video stream. The composite video, as seen by viewer 70, is a combination of the original published video stream and the inserted digital content.

Figure 9:
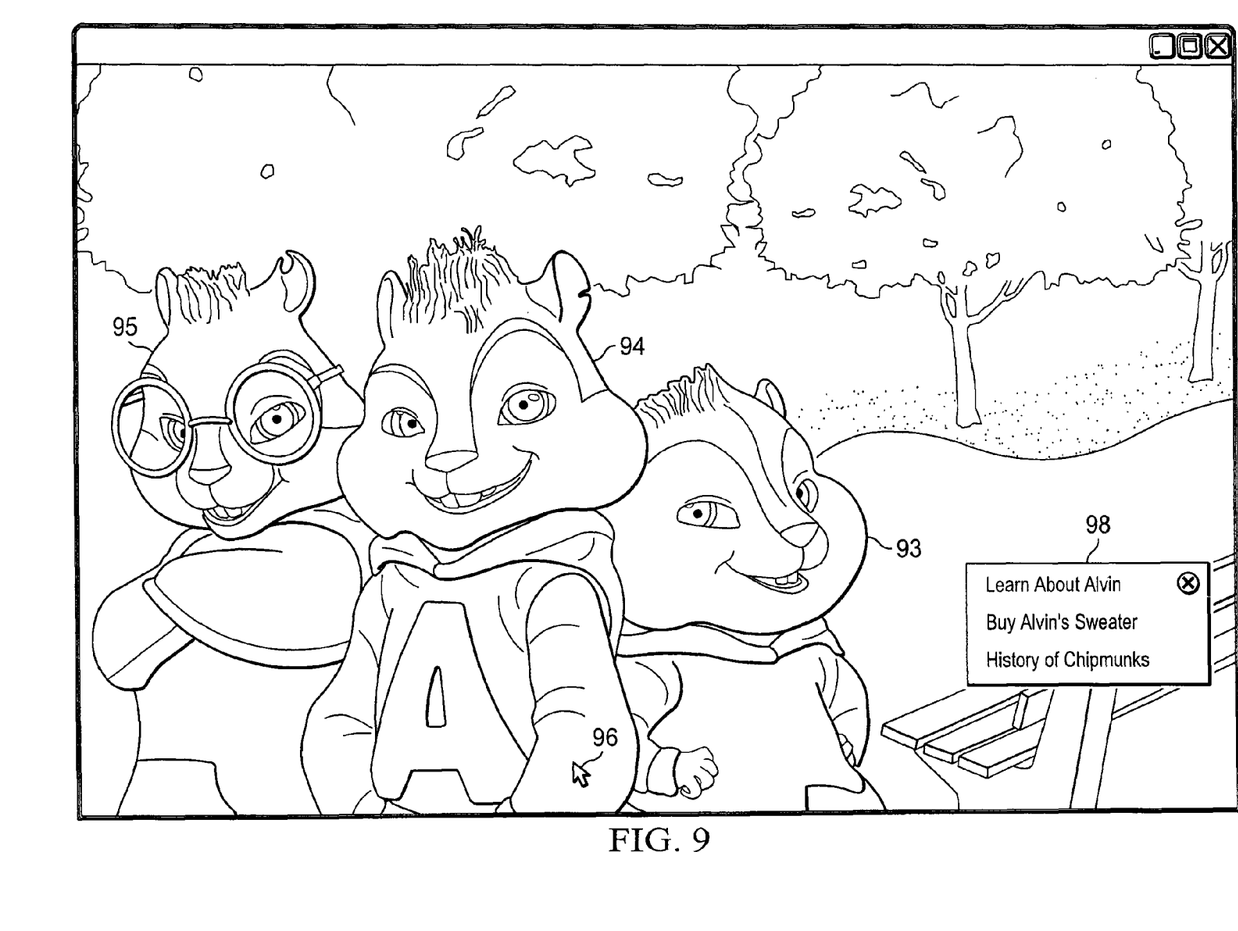
FIG. 9 illustrates a display monitor showing interactive digital content inserted into the video stream.

As an example of the requested video stream downloaded from video distributor 60 through Internet service provider 64, FIG. 9 shows a scene from a feature film containing cartoon characters 93, 94, and 95, in this case Alvin and the Chipmunks. Again, the video stream has a fingerprint or video signature that identifies spatial and temporal locations of the images being displayed on a pixel by pixel basis for each frame. Viewer 70 can interact with the images on display monitor 78 to request information which is retrieved from a database or Internet search, generate digital content related to the requested information, and then insert the digital content into the video stream. By pointing and clicking a pointing device (mouse) 96 over an image on display monitor 78, specific information can be requested and displayed. For example, viewer 70 pauses the film and points to Alvin's sweater with pointer device 96. Pointer device 96 can be a mouse, touch screen, remote control, or other interactive device. Window 98 pops up to allow viewer 70 to select topic of interest. Window 98 shows options of "Learn about Alvin", "Buy Alvin's Sweater", "History of Chipmunks". Viewer 70 selects "Learn about Alvin" with mouse 96. Alternatively, based on the point and click operation relative to the video signature, video distributor 60 can determine what part of the image viewer 70 is requesting information. The request "Learn about Alvin" is transmitted to video distributor 60. Video distributor 60 retrieves the information requested by viewer 70 using an Internet search or other database. The request can also be processed by a retailer, adverting agency, marketing firm, manufacturer, or other commercial source. The retrieved information is used to generate digital content 71, which is transmitted through Internet service provider 64 to the media player on computer 68 and inserted into the published video stream.

Figure 10:
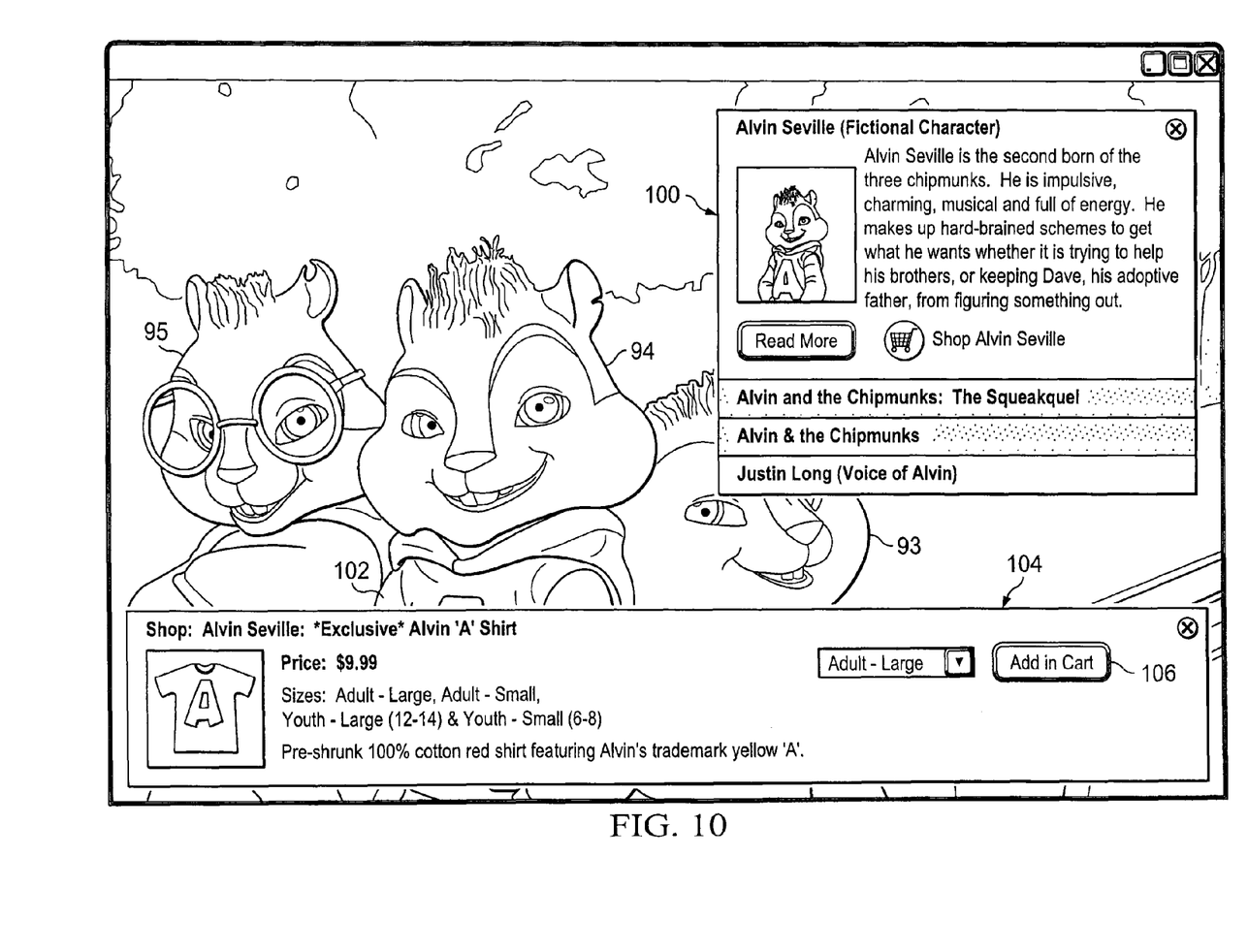
FIG. 10 illustrates the display monitor with additional interactive digital content inserted into the video stream.

FIG. 10 shows digital content 71 representing information about Alvin inserted into window 100. The information generally describes the character with the option to read more. Viewer 70 can also get further information on the film itself, more about Alvin and the Chipmunks, or learn about Justin Long (the voice of Alvin).

Alternatively, if viewer 70 selects "Buy Alvin's Sweater" in window 98 of FIG. 9, the request is transmitted to video distributor 60, retailer, adverting agency, marketing firm, manufacturer, or other commercial source. Video distributor 60 retrieves the information requested by viewer 70 using an Internet search or other database. The retrieved information is used to generate digital content 71, which is transmitted through Internet service provider 64 to the media player on computer 68 and inserted into the published video stream. FIG. 10 also shows the details for purchasing Alvin's sweater 102 in window 104, including retailer, description, price, size, and "Add to Cart" button 106 for checkout and purchase.

The operations and structure described in FIGS. 1-10 represent activity within a commerce system, including a retailer, consumer, network producer, video distributor, intermediate communication service provider, advertising agency, and video control service provider. In particular, FIGS. 6-10 demonstrate a process of presenting a commercial product in a commerce system involving transmitting a video stream through a communication link, such as elements 60-64 to present as an image on a video display monitor 78. The image includes a representation of the commercial product. In one embodiment, the viewer is able to select portions of digital content associated with goods and services, e.g., Alvin's sweater 102, using an interactive device, such as mouse 96. The viewer can request purchasing information to be displayed on the video monitor in real-time while viewing the associated video stream. The information related to the commercial product is retrieved based on the selected portion of the image on the video display device. The information can be retrieved from an Internet search or database maintained by the retailer, manufacturer, or advertising agency, distributors, producer, or other commercial source. In another embodiment, the database is stored on the DVD containing the video stream. Digital content 71 is generated containing the information related to the commercial product and inserted into the video stream to form composite video. The viewer can make the purchasing decision and complete the purchase transaction, all enabled by control of the video stream, including selecting a video image (pointing device 96 on Alvin's sweater 102), generating digital content 71 related to the commercial product, inserting digital content 71 into the published video stream in windows 100 and 104, and display of the composite video including the digital content to assist the consumer in completing a transaction to acquire the commercial product using the commerce system. Viewer 70 can select and complete a purchase transaction without moving attention from the video stream. The software, firmware, or other computer readable code, as provided by video control service provider 18 and integrated into the electronic communication systems or channels used by video distributor 60 and media player developed for computer system 68, controls operation of the commerce system.

Figure 11:
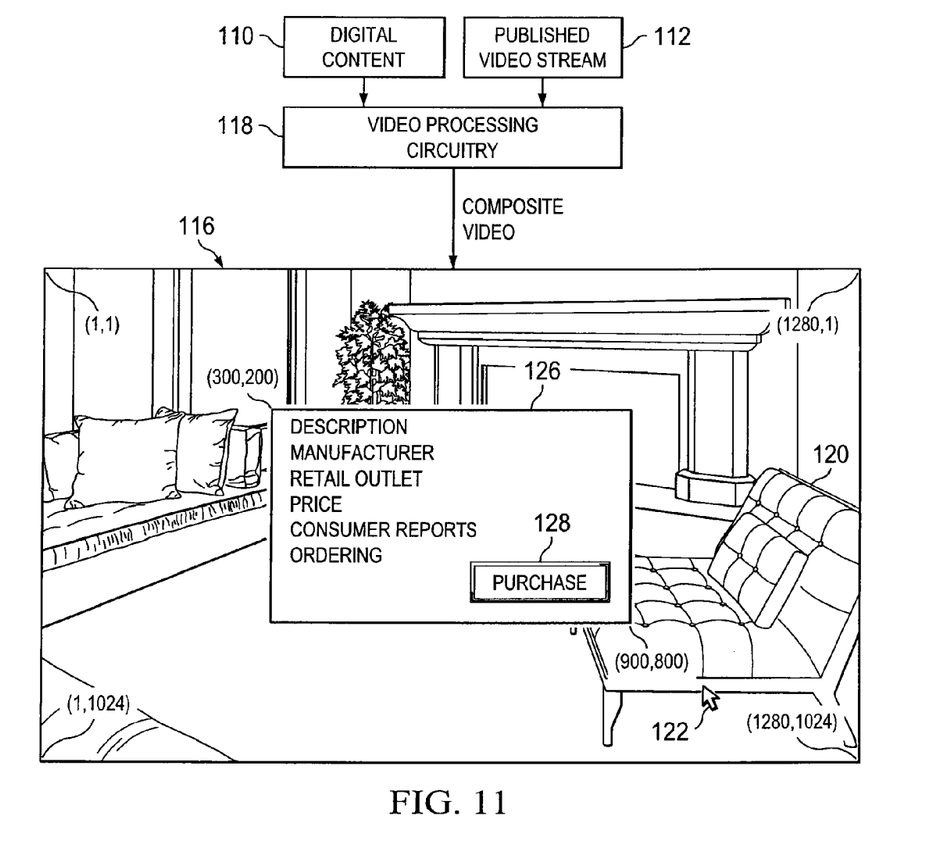
FIG. 11 illustrates electronic components for inserting interactive digital content into the video stream.

FIG. 11 shows further detail of a process of inserting digital content 110 into published video stream 112 and displaying the composite video on display 116. Video stream 112 originates from a network producer, video distributor, or other video publishing source. Video stream 112 is typically fixed in content as originally published. The published video stream 112 can be embedded in a serial digital interface and delivered by wireless broadcast signal, DVD, digital video recorder file, cable signal, satellite signal, or other video format. Digital content 110 originates from advertising agency, retailer, distributors, producer, or other commercial source. Digital content 110 can be broadcast to video processing circuitry or be contained in the digital video recorder file. Digital content 110 can be inserted into video stream 112 using video processing circuitry and programmable computer readable code 118, which is embodied in the video display controller within the set top cable box, cellular phone, or computer system displaying the composite video stream.

The video processing circuitry 118 containing programmable computer readable code to synchronize and map digital content 110 into video stream 112 using video fingerprinting, time-stamping, and time indexes on a pixel by pixel basis. In a frame of video stream 112, pixel locations (1,1) through (1280,1) represent a first row of display 116. Pixel locations (1,1024) through (1280,1024) represent a last row of display 116. Digital content 110 can be inserted into video stream 112 using a check-sum algorithm. Video processing circuitry 118 tracks timing from the start of video stream 112 and location of the video stream where digital content 110 is to be inserted. The system adjusts its time indexing so that digital content 110 matches to images shown in video stream 112. Digital content 110 is synchronized with video stream 112 so that network delays, user interaction, or other factors so that the digital content occurs at the appropriate location and time during the video stream. The synchronization of digital content 110 with video stream 112 is accomplished by video fingerprinting the video stream, time indexing the digital content and video stream, and monitoring the time indexes of the digital content and video stream, including any changes caused by the viewer pausing, rewinding, or fast forwarding the video stream.

Video processing circuitry 118 inserts digital content 110 into video stream 112 in the form of data packets. The data packets are classified as: control-type, extended control-type, and payload-type. A control-type data packet contains a preamble which is sent to the connecting system to indicate various status and options, e.g., whether data has been successfully received, or whether data encryption or compression should be turned on or off. An extended control-type data packet enables the exchange of control-type informational data packets, and is used to encrypt and decrypt data, as well as to identify the system that is connected. A payload-type data packet verifies delivery of the information relating to the video stream.

Each payload-type data packet has three sections: a preamble section, data payload section, and post-amble section. The preamble section can be multi-byte array formatted with a check byte acting as the fingerprint for the article, byte representing the data length of the data payload section to indicate the number of characters in the data payload section, transmission flag used to control the data compression and the status of the data payload when received, encryption flag used to set public ciphers and turn encryption on and off, and check byte to indicate the type of data payload section, as well as the marshalling type used with the transmission.

The CRC32 of the data payload section is used as a checksum. The data payload section can be marshaled in Native Byte Array, JSON, or standard AMF3, and is split into two components: the control header and data packet. The control header is used to control the routing of the packet, and ensure that the requested information is sent. The data packet represents the informational data related to the video data stream. The post-amble section is similar to the preamble with a flag indicating whether the data is equal to its checksum, indicating whether the informational data packet was successfully delivered.

The control header of the data packet contains a unique identifier indicator for directing the server to the proper backend service needed to process the request. A command indicator identifies what type of function is being requested. A reply required indicator identifies if the sender of the information is expecting a response, an ID number, which is a sequential number used for each packet and is unique for each type of packet sent and is also included in any potential response for identifying any packet for which a response is sent. A return ID number that matches the ID number is included in the response. A channel indicator identifies which channel should be used to send a response. A client ID indicator enables the system to determine that the user has authorization to access the function requested. A priority indicator enables the system to move a packet to the front of the packet queue if it has priority over other packets in the queue. A time stamp indicates the date and time the packet was created and is also used to determine the amount of time a transaction will take. A unique channel order indicator identifies which channel is used to send the information. A computer ID, implemented as a 6-byte address on a network card, is unique for each system. A number of items indicator identifies the number of items in the array representing the data packet.

As an example, the published video stream 112 originally contains an image of a room with furniture displayed in pixel locations (1,1) through (1280,1024). Assume the viewer wants to know more about chair 120. The viewer pauses the video stream and clicks on chair 120 with pointer device 122 to request the information. Pointer device 122 can be a mouse, touch screen, remote control, or other interactive device. The request is routed through the video communication link to the publishing source of video stream 112, advertising agency, retailer, or other commercial source. The information about chair 120 is retrieved from a database or other data search and used to generate digital content 110. Digital content 110 is inserted into the portion of video stream 112 representing block 126. There is no alteration of the video stream 112 other than insertion of digital content 110. Accordingly, digital content 110 can be subsequently changed without having to alter the video stream, allowing information to be easily updated and incorporated into the plurality of data packets. The composite video includes the video stream 112 with inserted digital content 110 which is displayed from pixel location (1,1) through (1280, 1024). The inserted digital content portion of the composite video occupies individual mapped points or hot spots (300,200) through (900,800) in block 126. Block 126 shows description, manufacturer, retail outlet, price, consumer reports, and ordering details of chair 120. The information displayed in block 126 may contain a website hyperlink to connect the viewer to a particular Internet website. The viewer can review the information, request additional information, and purchase chair 120 by clicking on purchase block 128. The viewer enters credit card and shipping in block 126. The purchase confirmation, including payment, shipping, and warranty information is displayed in block 126.

Figure 12:
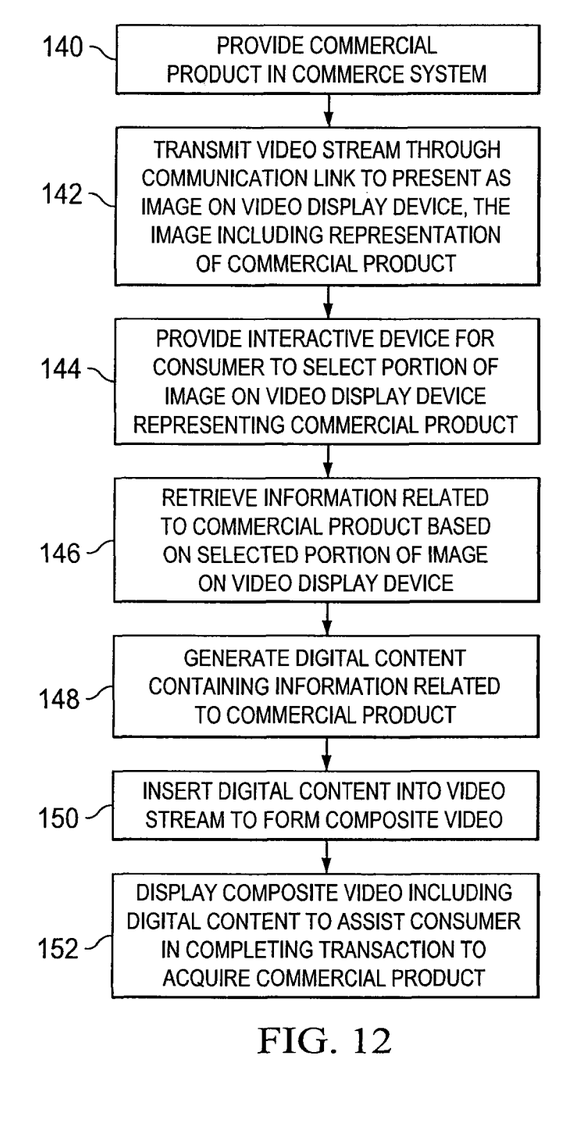
FIG. 12 is a process of presenting a commercial product in a commerce system by inserting digital content into the video stream.

FIG. 12 illustrates a process flowchart of presenting a commercial product in a commerce system. In step 140, a commercial product is provided in a commerce system. In step 142, a video stream is transmitted through a communication link to present as an image on a video display device. The video display device is a video display monitor, cellular phone, or television. The image includes a representation of the commercial product. In step 144, an interactive device is provided for a consumer to select a portion of the image on the video display device representing the commercial product. In step 146, information related to the commercial product is retrieved based on the selected portion of the image on the video display device. The information related to the commercial product includes description, price, and ordering information. In step 148, digital content is generated containing the information related to the commercial product. The digital content is generated by an adverting agent, manufacturer, or retailer. In step 150, the digital content is inserted into the video stream as data packets to form composite video. The digital content is inserted into the video stream using a cable box, satellite receiver, video disc player, digital video recorder, computer, or cellular phone. In step 152, the composite video including the digital content is displayed to assist the consumer in completing a transaction to acquire the commercial product.

Figure 13:
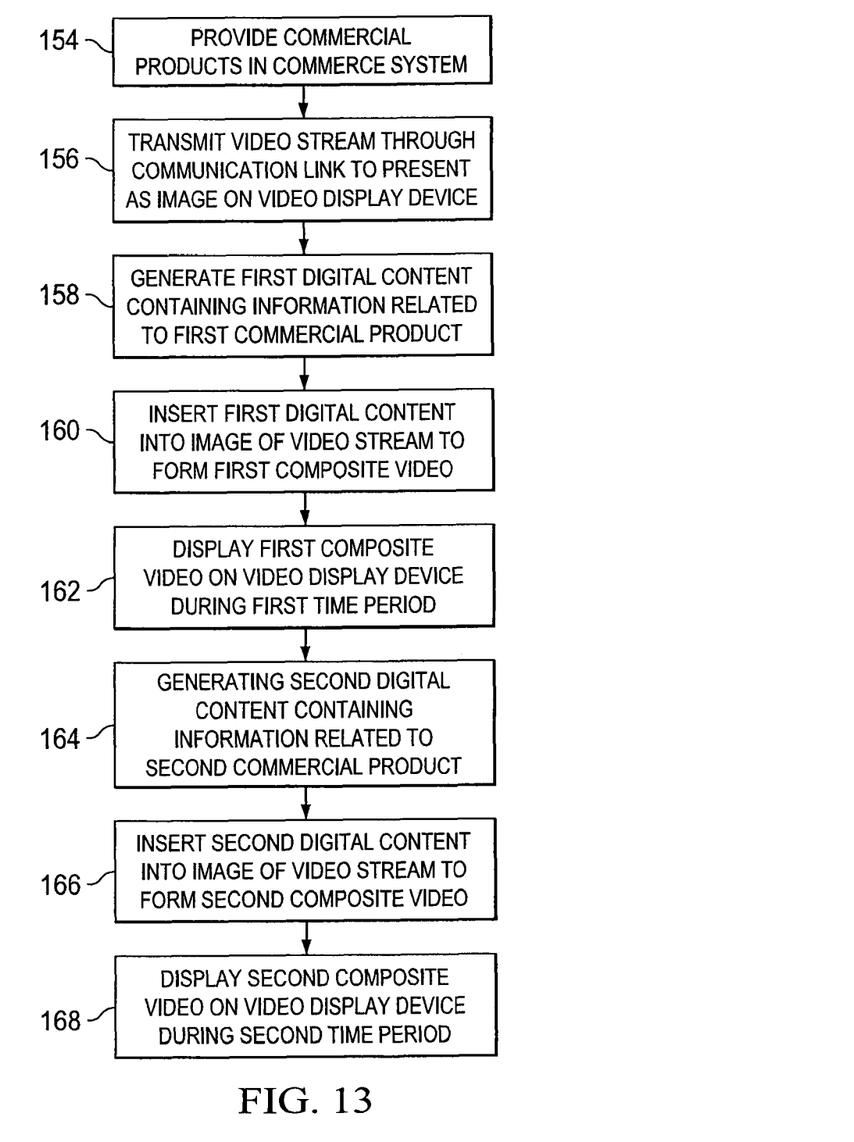
FIG. 13 is another process of presenting a commercial product in a commerce system by inserting digital content into the video stream.

FIG. 13 illustrates another process flowchart of presenting a commercial product in a commerce system. In step 154, commercial products are provided in a commerce system. In step 156, a video stream is transmitted through a communication link to present as an image on a video display device. The video display device includes a video display monitor, cellular phone, or television. In step 158, a first digital content is generated containing the information related to a first commercial product. In step 160, the first digital content is inserted into the image of the video stream as data packets to form a first composite video. In step 162, the first composite video is displayed on the video display device during a first time period. In step 164, a second digital content is generated containing the information related to a second commercial product. The first and second digital content is generated by an adverting agent, manufacturer, or retailer. In step 166, the second digital content is inserted into the image of the video stream as data packets to form a second composite video. The first and second digital content is inserted into the video stream using a cable box, satellite receiver, video disc player, digital video recorder, computer, or cellular phone. In step 168, the second composite video is displayed on the video display device during a second time period. The first digital content is inserted into a portion of the image of the video stream during the first time period and the second digital content is inserted into the portion of the image of the video stream during the second time period.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of presenting a commercial product in a commercial system, comprising:
   providing a commercial product in a commerce system;
   providing a published video stream having a fingerprint for identifying a spatial and temporal location of a sponsorship display space within the published video stream for dynamically altering the published video stream in real-time by inserting digital content into the sponsorship display space;

transmitting the published video stream through a communication link to present as an image on a video display device, the image including a representation of the commercial product;

providing an interactive device for a consumer to select a portion of the image on the video display device representing the commercial product;

retrieving information related to the commercial product based on the selected portion of the image on the video display device;

after retrieving the information related to the commercial product, generating digital content contain the information related to the commercial product and an interface for enabling the consumer to access information related to the commercial product;

forming a composite video by inserting the digital content into the sponsorship display space, wherein the digital content is inserted into the spatial and temporal locations as identified in the fingerprint; and displaying the composite video including the digital content on the video display device to assist the consumer in completing a transaction to acquire the commercial product.

2. The method of claim 1, further including processing video related data in a distributed computing system.

3. The method claim 1, wherein the video display device includes a video display monitor, cellular phone, or television.

4. The method of claim 1, further including inserting the digital content into the sponsorship display space using a cable box, satellite receiver, video disc player, digital video recorder, computer, or cellular phone.

5. The method of claim 1, further including generating the digital content through an advertising agent, manufacturer, or retailer.

6. The method of claim 1, wherein the information related to the commercial product includes description, price, and ordering information.

7. A method of presenting a commercial product in a commerce system, comprising:

providing commercial products in a commerce system;

providing a published video stream having a fingerprint for identifying a spatial and temporal location of a sponsorship display space within the published video stream for dynamically altering the published video stream in real-time by inserting first and second digital content into the sponsorship display space;

transmitting the published video stream through a communication link to present as an image on a display device;

after retrieving the information related to the commercial product, generating a first digital content containing information related to the first commercial product;

forming a composite video by inserting the first digital content into the sponsorship display space, wherein the first digital content is inserted into the spatial and temporal locations as identified in the fingerprint; and displaying the first composite video on the video display device during a first time period.

8. The method of claim 7, further including:

generating second digital content containing the information related to a second commercial product;

forming an second composite video by inserting the second digital content into the sponsorship display space of the published video stream;

displaying the second composite video on the video display device during a second time period.

9. The method claim 7, wherein the video display device includes a video display monitor, cellular phone, or television.

10. The method of claim 7, further including inserting the first digital content into the sponsorship display space of the published video stream using a cable box, satellite receiver, video disc player, digital video recorder, computer, or cellular phone.

11. The method of claim 7, further including generating the first digital content through an advertising agent, manufacturer, or retailer.

12. The method of claim 7, wherein the first digital content is inserted into the sponsorship display space during the first time period and the second digital content is inserted into the sponsorship display space during the second time period.

13. The method of claim 7, further including:

providing an interactive device for a consumer to select a portion of the image on the video display device representing the commercial product;

retrieving information related to the commercial product based on the selected portion of the image on the video display device.

14. A computer program product, comprising computer readable code recorded on a computer readable medium, the computer readable program code adapted to implement a method of presenting a commercial product in a commerce system, comprising:

providing a commercial product in a commerce system;

providing a published video stream having a fingerprint for identifying a spatial and temporal location of a sponsorship display space within the published video stream for dynamically altering the published video stream in real-time by inserting digital content into the sponsorship display space;

transmitting the published video stream through a communication link to present as an image on a video display device, the image including a representation of the commercial product;

providing an interactive device for a consumer to select a portion of the image on the video display device representing the commercial product;

retrieving information related to the commercial product based on the selected portion of the image on the video display device;

generating digital content contain the information related to the commercial product and an interface for enabling the consumer to access information related to the commercial product;

forming a composite video by inserting the digital content into the sponsorship display space, wherein the digital content is inserted into the spatial and temporal locations as identified in the fingerprint; and displaying the composite video including the digital content on the video display device to assist the consumer in completing a transaction to acquire the commercial product.

15. The computer program product of claim 14, further including processing video related data in a distributed computing system.

16. The computer program product of claim 14, where the video display device includes a video display monitor, cellular phone, or television.

17. The computer program product of claim 14, further including inserting the digital content into the sponsorship display space using a cable box, satellite receiver, video disc player, digital video recorder, computer, or cellular phone.

18. The computer program product of claim 14, further including generating the digital content through an adverting agent, manufacturer, or retailer.

19. The computer program product of claim 14, wherein the information related to the commercial product includes description, price, and ordering information.

20. A system for presenting a commercial product in a commerce system, comprising:
a published video stream having a fingerprint for identifying a spatial and temporal location of a sponsorship display space within the published video stream for dynamically altering the published video stream in real-time by inserting digital content into the sponsorship display space;
a commerce system having a plurality of communication links for transmitting the published video stream as an image on a video display, the image including a representation of a commercial product;
an interactive device for a consumer to select a portion of the image on the video display device representing the commercial product;
means for retrieving information related to the commercial product based on the selected portion of the image on the video display device;
means for generating digital content containing the information related to the commercial product;
means for inserting the digital content into the sponsorship display space of the published video stream to forma composite video, wherein the digital content is inserted into the spatial and temporal locations as identified in the fingerprint;
means for displaying the composite video including the digital content on the video display device to assist the consumer in completing a transaction to acquire the commercial product.

21. The system of claim 20, further including a distributed computing system for processing video related data in a distributed computing system.

22. The system of claim 20, wherein the video display device includes a video display monitor, cellular phone, or television.

23. The system of claim 20, further including inserting the digital content into the sponsorship display space of the published video stream using a cable box, satellite receiver, video disc player, digital video recorder, computer, or cellular phone.

24. The system of claim 20, wherein the digital content is generated by an advertising agent, manufacturer, or retailer.

25. The system of claim 20, wherein the information related to the commercial product includes description, price, and ordering information.

26. A method of presenting a commercial product in a commercial system, comprising:
providing a commercial product in a commerce system;
providing a published video stream having a fingerprint for identifying a spatial and temporal location of a sponsorship display space within the published video stream for dynamically altering the published video stream in real-time by inserting digital content into the sponsorship display space;
transmitting the published video stream through a communication link to present as an image on a video display device, the image including a representation of the commercial product;
generating first digital content contain the information related to the commercial product;
forming a first composite video by inserting the digital content into the sponsorship display space, wherein the digital content is inserted into the spatial and temporal locations as identified in the fingerprint; and
displaying the composite video including the digital content on the video display device to assist the consumer in completing a transaction to acquire the commercial product.

27. The method of claim 26, further including:
generating second digital content containing the information related to a second commercial product;
forming an second composite video by inserting the second digital content into the sponsorship display space of the published video stream to form a second composite video; and
displaying the second composite video on the video display device.

28. The method of claim 26, wherein the digital content contains an interface for enabling a consumer to access information related to the first commercial product.

29. The method of claim 26, further including providing an interactive device for a consumer to select a portion of the image on the video display device representing the first commercial product.

30. The method of claim 26, wherein the video display device includes a video display monitor, cellular phone, or television.

31. The method of claim 26, including inserting the digital content into the sponsorship display space using a cable box, satellite receiver, video disc player, digital video recorder, computer, or cellular phone.

* * * * *